3,516,974
ACRYLONITRILE COPOLYMERS CONTAINING SULFONIC ACID GROUPS
Heinrich Rinkler, Dormagen, Rudolf Braden, Odenthal-Scheuren, and Gunther Nischk, Dormagen, Germany, assignors to Farbenfabriken Bayer Aktiengesellschaft, Leverkusen, Germany, a corporation of Germany
No Drawing. Filed Oct. 30, 1967, Ser. No. 679,216
Claims priority, application Germany, Nov. 5, 1966, F 50,613
Int. Cl. C08f 3/76
U.S. Cl. 260—79.3    10 Claims

ABSTRACT OF THE DISCLOSURE

The invention relates to acrylonitrile copolymers which have a good affinity to basic dyes and which contain as a comonomer ethylenically unsaturated sulfonic acid compounds of the general formula

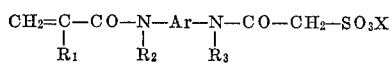

wherein $R_1$, $R_2$, and $R_3$ represent hydrogen or a $C_1$ to $C_4$ alkyl radical and X represents hydrogen, a $NH_4$ group, an alkali metal or an organic ammonium group. The copolymers are produced by copolymerising acrylonitrile, said ethylenically unsaturated sulfonic acid compound and optionally an additional copolymerisable compound in a fluid medium in the presence of a radical forming catalyst system.

---

The present invention relates to acrylonitrile copolymers which have good affinity to basic dyes and to a process for their production by copolymerisation of acrylonitrile with unsaturated compounds which contain sulfonic acid groups.

It is known that fibres and yarns produced from acrylonitrile homopolymers, and copolymers of acrylonitrile with neutral comonomers have insufficient affinity to dyestuffs for practical purposes. Therefore it is very difficult to dye them with basic or acid dyes.

In order to increase the susceptibility of these fibres and yarns to basic dyes, copolymers have been prepared from carboxyl-group containing components such as acrylic and methacrylic acid or itaconic acid. These polymers, however, show a considerable tendency to undergo discoloration at elevated temperatures.

The affinity of the fibres and yarns to basic dyes can be increased by incorporating by polymerisation comonomers containing sulfo groups. The known processes, however, are often unsatisfactory from a commercial standpoint. Sodium methallyl sulfonates and sodium allyl sulfonates can only be copolymerised with acrylonitrile in low yields and only a fraction of the comonomers introduced into the reaction is taken up in the polymer. This last mentioned disadvantage also applies to the copolymerisation of acrylonitrile with N-monosubstituted acrylamide derivatives which contain sulfo groups, such as N-acryloyltaurine or N-acryloyl-p-aminophenylmethane sulfonic acid. Other known polymerisable comonomers which contain sulfo groups, such as vinyl sulfonic acid and vinyl benzene sulfonic acid and their salts, can be copolymerised in an aqueous medium but it is difficult to use them in a solution polymerisation process owing to their low solubility in the usual organic solvents.

When polymerisation is carried out in a solvent in which the resulting polymer is soluble, the starting materials, especially the polymerisable comonomers used, must be readily soluble in the reaction medium. If they are not soluble the comonomers may not be incorporated in the macromolecule in the statistically required quantity and furthermore, the tendency of the resulting solutions to gel will be increased by undissolved particles and depositions of salt, thus making it particularly difficult to spin the solutions.

We have now found new acrylonitrile copolymers consisting of at least 50% by weight of copolymerised acrylonitrile and 0.1 to 20% by weight of the unit of the formula

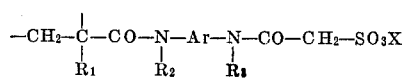

wherein $R_1$, $R_2$ and $R_3$, which may be different or not, represent a hydrogen atom or a $C_1$ to $C_4$ alkyl radical, Ar represents an arylene radical and X represents a hydrogen atom, the ammonium group, an alkali metal or an organic ammonium group, the balance being an additional copolymerised unsaturated compound. These copolymers are readily dyeable with basic dyes and show a considerable stability against discoloration at elevated temperatures.

The new acrylonitrile copolymers can be produced by a process which comprises copolymerising at least 50% by weight, based on the total amount of monomers, of acrylonitrile and 0.1 to 20% by weight of an ethylenically unsaturated sulfonic acid compound of the formula

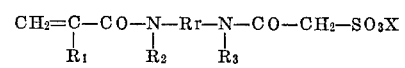

wherein $R_1$, $R_2$, and $R_3$, which may be different or not, represent a hydrogen atom or a $C_1$ to $C_4$ alkyl radical, Ar represents an arylene radical and X represents a hydrogen atom, the ammonium group, an alkali metal or an organic ammonium group, the balance being an additional copolymerisable unsaturated compound, said copolymerising being carried out in a fluid medium in the presence of a radical forming catalyst system.

The acrylonitrile copolymers according to the invention show a very low tendency to gel formation in concentrated solutions.

The following compounds are examples of suitable ethylenically unsaturated sulfonic acid compounds (alkenylamido-N-arylene-N'-acetylamidosulfonic acids) according to the present invention:

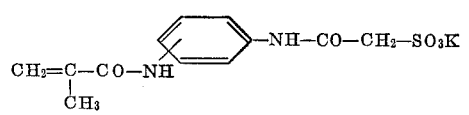

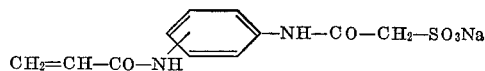

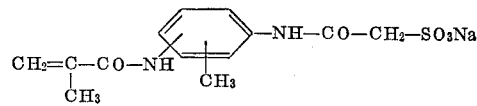

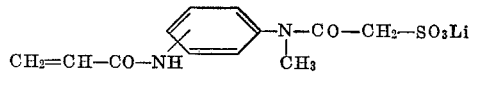

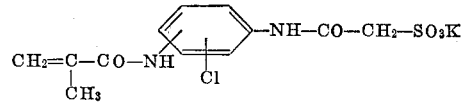

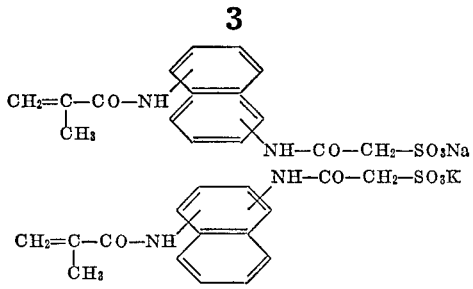

The unsaturated sulfonic acids can be prepared by the following methods. The nitro groups of methacryloyl-amino-nitroaryl compounds, for example, are reduced by means of reducing mixtures such as iron/hydrochloric acid, and the reduction products are reacted with ω-halocarboxylic acid chlorides. The unsaturated ω-alkyl compounds so obtained are then reacted with alkali metal sulfites in aqueous alcoholic solution. Alternatively, nitroaryl-amino compounds can be reacted with ω-halocarboxylic acid chlorides, and the resulting nitro-ω-haloalkylaryl compounds can then be reduced to the corresponding amino-ω-haloalkylaryl products which can be reacted with unsaturated acid chlorides, followed by reaction with alkali metal sulfites on the haloalkyl group.

The compounds obtained by reaction between nitroaryl-amino compounds and ω-halo-carboxylic acid chlorides may also be reacted with the alkali metal sulfites in an aqueous alcoholic medium, the aromatic nitro group being subsequently reduced. The resulting amino-aryl-ω-alkyl sulfonic acids or their salts are then reacted with unsaturated acid chlorides.

The quantity of sulfonic acid compounds which are incorporated in the acrylonitrile polymer is from 0.1 to 20% by weight, based on the total amount of monomers. If the copolymers are to be used for the production of fibers and yarns, the addition of 0.5 to 1.0% by weight of comonomers containing sulfonic acid groups is usually sufficient to impart the degree of dyeability generally required in practice. In order to achieve special effects, e.g. a high increase in the hydrophilic character or swelling capacity of the polymers, the sulfonic acid groups containing comonomers can be incorporated by polymerisation in quantities of 4 to 8%.

When the acrylonitrile is polymerised by solution polymerisation in organic solvents such as dimethylformamide, dimethylacetamide, dimethylsulfoxide or ethylene glycol carbonate, a greater concentration of reaction components is usually required to achieve a given dyeability than in the production of the polymers under aqueous conditions. In this case, all the sulfonic acid groups must be incorporated by copolymerisation since the catalysts which are used for preference yield neutral end groups.

2 to 4% based on the total quantity of monomers, of the sulfonic acid group-containing comonomers should be used. It is a special advantage of the process that the comonomers according to the invention are readily soluble in the above-mentioned solvents even at the relatively high concentration used, thus enabling satisfactory spinning solutions to be prepared by solution polymerisation in organic solvents.

The copolymerisation of acrylonitrile with the comonomers used according to the invention is preferably carried out in the presence of additional copolymerisable unsaturated compounds. These compounds include, among others, acrylic acid esters and methacrylic acid esters, vinyl esters, styrene and its neutral derivatives, vinyl chloride, vinylidene chloride, vinyl bromide, butadiene, chloroprene, acrylamides and methacrylamides, vinyl alkyl ketones, vinylidene cyanide and divinyl compounds, and comonomers which have a basic character, such as vinyl pyridine and derivatives thereof. By incorporating by polymerisation a third comonomer such as methyl acrylate, methyl methacrylate or vinyl acetate, the solubility of the polymers can be substantially increased, and, in addition, the dyeing properties of the fibres can be further improved. The amount of comonomers contained in the polymer is from 2 to 20% and is, preferably, from 5 to 7%. If one wishes to produce easily dyed polyacrylic fibres which have specific properties, the additional reaction components are as a rule used in a relatively high proportion with respect to the acrylonitrile. If acrylonitrile is copolymerised with 1 to 3% of the comonomers which contain sulfonic acid groups and, for example, with 25 to 45% vinylidene chloride, very highly soluble polymers and very highly concentrated spinning solutions can be obtained. The fibres spun from these solutions have good dyeability together with thermostability and greatly reduced inflammability and combustibility. The copolymerisation of acrylonitrile with the comonomers can be carried out by known polymerisation processes, e.g. in aqueous emulsion, dispersion, or in solution. In the case of emulsion polymerisation, the known emulsifiers, such as salts of fatty acids, alkyl- or aryl-sulfonates, as well as non-ionic emulsifiers may be used. If comonomers which are badly soluble in water such as vinylidene chloride are being used in the dispersion polymerisation solubilising agents such as low alcohols may be added. Solution polymerisation may be carried out in aqueous concentrated salt solutions such as zinc chloride solutions and calcium chloride solutions or in solutions of inorganic thiocyanates or in organic solvents such as dimethylformamide, dimethylacetamide, dimethylsulfoxide, ethylene glycol carbonate or butyrolactone.

Polymerisation in an aqueous medium is preferably carried out without the addition of emulsifiers, using water-soluble radical-forming catalyst systems. Inorganic or organic per-compounds or azo compounds may be used, for this purpose. Redox systems are generally preferred, however, in particular redox systems based on per compounds and sulfur compounds in low stages of oxidation. Water soluble salts of peroxydisulfuric acid, such as potassium-, sodium- or ammonium persulfate are preferably used in the redox system as per compounds. Highly effective reducing components are sulfur dioxide, alkali metal hydrosulfites, alkali metal pyrosulfites and alkali metal thiosulfates. Sodium or potassium bisulfite or pyrosulfite are preferably used as reducing component. The catalysts are employed in quantities of 0.5 to 5%, based on the total weight of monomers. The ratio between oxidising and reducing agents in the redox system may be from 2:1 to 1:50, preferably from 1:2 to 1:10. The reaction temperature chosen may be from +10 to +70° C., preferably from +40 to +55° C. The pH of the reaction mixture is from 1 to 6, preferably 2.5 to 4.

Solution polymerisation is preferably carried out in organic solvents in the presence of radical-forming catalysts. In this case, the proportions of monomers and solvents in the reaction mixture may be varied within wide limits, depending on which solvents and/or additional comonomers are used, and in what proportion they are used with respect to the acrylonitrile. If acrylonitrile is copolymerised in dimethylformamide only with the comonomers according to the invention, the monomer concentration must be kept below 25% by weight if clear solutions which do not undergo gelling are to be obtained. If copolymerisation is carried out together with, for example, 5 to 8 percent by weight of methyl acrylate and vinyl acetate, the initial monomer concentration may be up to about 40% by weight, preferably between 25 and 35% by weight, without gel formation or clouding of the solution occurring during or after completion of polymerisation. When acrylonitrile is polymerised with about 25 to 45% of vinylidene chloride, the monomer concentration in the dimethyl formamide is preferably from 30 to 60% by weight. Owing to the inferior solution properties obtained, the limits of the initial monomer concentration are about 5 to 10% by weight lower for dimethylacetamide, ethylene carbonate and dimethylsulfoxide than for dimethylformamide.

The reaction mixture generally contains up to about 3% catalysts.

The polymerisation temperature may be chosen within a wide range of temperatures between 0 and 100° C., depending on the catalysts and solvent used. Preferably, however, polymerisation is carried out between 25 and 60° C. When the desired reaction concentration or solution concentration has been reached, polymerisation is stopped by the addition of a known inhibitor. The solution can be spun by known dry or wet spinning processes either directly or after removal of unreacted monomers, e.g. by means of a thin layer evaporator under reduced pressure. The spinning solutions obtained are colourless or only slightly discoloured, clear, and free from gel, thus ensuring that subsequent working up occurs easily. The solutions can be stored for a considerable length of time after removal of the unreacted monomers without the solutions undergoing any substantial change in viscosity.

When copolymerisation is carried out in an aqueous medium or in solvents, the unsaturated sulfonic acids used according to the invention yield polymers which can be dyed in deep tones with basic dyes. The polymers and the solutions produced from the polymers show excellent thermostability.

Polymers obtained by precipitation polymerisation under aqueous conditions can also be worked up to produce clear, gel-free spinning solutions by suitable solution processes, and these solutions can then be spun without any difficulty.

The percentages and parts indicated in the description and in the examples which follow denote percentages and parts by weight, based on the total amount of reactants, unless otherwise indicated.

The preparation of an unsaturated sulfonic acid is described below by way of example:

176 parts of 3-methacryloyl-amino-aniline (obtained from 3-methacryloylamino-nitrobenzene by reduction with iron/hydrochloric acid) and 106 parts of soda are added to 700 to 1000 parts of methylene chloride, and 113 parts of chloroacetyl chloride are added while the reaction mixture is cooled with ice and water. Stirring is continued for 3 to 4 hours at room temperature, the product is filtered and the residue is recrystallised from dioxane (separation of the salt portion). Yield: 208 parts, M.P. 112–114° C.

126 parts of the compound

were dissolved with 0.5 part of thiosemicarbazide in 350 parts of ethanol, with application of heat. 200 parts of 40% potassium sulfite solution are added dropwise at 50 to 60° C. Stirring is then continued for 1 to 2 hours at 60° C. and the reaction mixture is cooled and filtered. Yield: 130 parts.

The following examples are to illustrate the invention without limiting it.

EXAMPLE 1

A reaction mixture consisting of 1860 parts of water, 131.6 parts of acrylonitrile, 7 parts of methyl acrylate and 1.4 parts of the compound

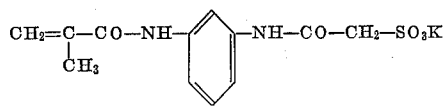

is heated to 50° C. under nitrogen. Polymerisation is initiated using a mixture of 1 part of potassium persulfate and 4 parts of sodium metabisulfite. Stirring is continued for 3 to 4 hours at 60° C. and the reaction mixture is then filtered and the residue thoroughly washed with warm water and dried at 50° C.

The yield of polymer amounted to 82.5% of theoretical; the polymer had a K-value of 87 (according to Fikentscher, Cellulosechemie 13, p. 58, 1932).

EXAMPLE 2

A reaction mixture consisting of 130 parts of dimethylformamide, 63 parts of acrylonitrile, 4.2 parts of methyl acrylate, 2.8 parts of the compound

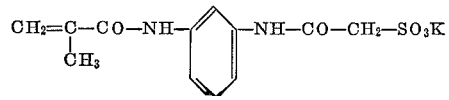

1.2 parts of water, 0.4 part of conc. sulfuric acid, 0.6 part of toluene sulfinic acid amide and 0.6 part of mono-tertiarybutylpermaleate (50% paste in dimethyl phthalate) is stirred under nitrogen for 6 to 10 hours at 35 to 40° C. A slightly yellowish, viscous emulsion is produced in a 3:1 mixture of water and methanol. The polymer yield was 75%, and a K-value of 80.5 was obtained.

EXAMPLE 3

Polymerisation was carried out in a pressure resistant closed glass vessel at 35° C. in a nitrogen atmosphere. The reaction vessel contained 220 parts of dimethylformamide, 116.6 parts of acrylonitrile, 58 parts of vinylidene chloride, 5.4 parts of the compound of the formula

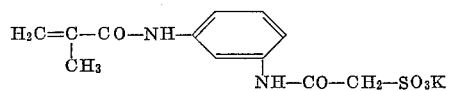

1.2 parts of mono-tertiary butyl permaleate 0.8 part of p-toluenesulfinic acid amide, 0.6 g. of conc. sulfuric acid and 3.2 parts of water. The reaction was stopped after 20 to 24 hours. The viscous solution formed was clear and almost colourless. The yield of polymer which had a K-value of 78.5, was 71.5%.

EXAMPLE 4

3720 parts of distilled water, 266 parts of acrylonitrile, 14 parts of methyl acrylate and 5.6 parts of the compound

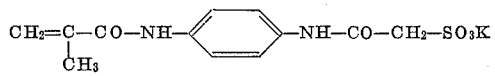

are heated to 50° C. under nitrogen. Polymerisation is initiated with the mixture of 3 parts of potassium persulfate and 6 parts of metabisulfite. Polymerisation is continued for 4 hours at 60° C. The finely granular polymer obtained is separated by filtration under suction, washed thoroughly with warm water and dried at 50 to 60° C. The yield of polymer was 248 parts (89%), and the polymer had a K-value of 87.

EXAMPLE 5

260 parts of dimethylformamide, 126 parts of acrylonitrile, 8.4 parts of methyl acrylate and 5.6 parts of the compound

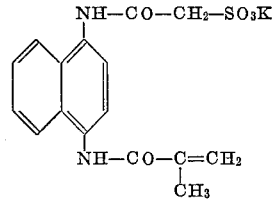

2 parts of water, 0.6 part of conc. sulfuric acid, 1 part of benzene sulfinamide and 1.1 parts of mono-tertiary-butyl-permaleate (50% paste in dimethylphthalate) are stirred for 15 to 18 hours at 40° C. under nitrogen. The slightly yellowish, viscous solution is precipitated in water. The yield of polymer was 77%; the K-value 79.

In order to test the tendency to discoloration, 5% solutions in dimethylformamide were prepared from the copolymers, and these solutions were tempered at 80° C. in the presence of air. The extinction values of the solutions were determined after 2.4 and 20 hours by means of an electrophotometer (Type BFK Photometer DS 1 of the firm Kipp and Zonen) at a wavelength of 312μ (cut length 1 cm., standard solution pure DMF).

For comparison, an acrylonitrile homopolymer by the process described in Example 1 (K-value 86) was used. The values of extinction properties obtained are indicated in the following Table I.

TABLE I

| Polymer from Example No. | Extinction value at 312 Mμ after— | | |
|---|---|---|---|
| | 2 hours | 4 hours | 20 hours |
| 1 | 0.563 | 0.605 | 0.711 |
| 2 | 0.511 | 0.531 | 0.682 |
| 4 | 0.423 | 0.463 | 0.618 |
| 5 | 0.498 | 0.552 | 0.672 |
| Comparison | 0.770 | 0.850 | 0.960 |

The sulfonic acid groups content of the polymer was determined by potentiometric titration in dimethylformamide solution, whereby 1 g. of polymer in 100 ml. of dimethylformamide was treated with a mixed bed of ion exchanger and then with a strongly acid ion exchanger and was titrated with M/100 methanolic hydroxide solution. The measuring instrument used was a pH meter manufactured by Messrs. Knick, Type 52 (Calomel glass electrode).

The values obtained are shown in Table II as milliequivalents of acid groups per 1000 g. of polymer. In addition, the increased dyeability of the copolymers can be shown by dyeing the resulting films with basic dyes. The films are produced from a 15% dimethylformamide solution in a layer thickness of about 50μ, washed until free from solvent and dyed for one hour at boiling temperature with Astrazonblau B (Colour Index 2nd edition, vol. III, No. 52140) in a dyeing bath of the following composition:

100 ml. Astrazonblau B solution (1 g./l.)
2 ml. acetic acid (30 g./l.)
0.3 ml. sodium acetate (40 g./l.)

Quantitative determination of the amount of dye taken up is carried out by dissolving the dyed films in dimethylformamide which contains 1 g. of sulfuric acid per litre. The amount of dye taken up per gram of film is determined by means of a photometer and calibration curve.

TABLE II

| Polymer from Example No. | Milliequivalent acid groups/ 1,000 g. Pm. | G. dye/G. film |
|---|---|---|
| 1 | 59.2 | $0.82 \cdot 10^{-2}$ |
| 2 | 146.1 | $2.15 \cdot 10^{-2}$ |
| 3 | 87.5 | $1.21 \cdot 10^{-2}$ |
| 4 | 78.3 | $1.1 \cdot 10^{-2}$ |
| 5 | 97.0 | $1.25 \cdot 10^{-2}$ |
| Comparison | 23.0 | $0.25 \cdot 10^{-2}$ |

What we claim is:

1. An acrylonitrile copolymer consisting of at least 50% by weight of copolymerised acrylonitrile and 0.1 to 20% by weight of the unit of the formula $$-CH_2-\underset{R_1}{\underset{|}{C}}-CO-\underset{R_2}{\underset{|}{N}}-Ar-\underset{R_3}{\underset{|}{N}}-CO-CH_2-SO_3X$$

wherein $R_1$, $R_2$ and $R_3$ independently represent a hydrogen atom or a $C_1$ to $C_4$ alkyl radical, Ar represents an arylene radical and X represents a hydrogen atom, the ammonium group, an alkali metal or an organic ammonium group, the balance being an additional copolymerised unsaturated compound.

2. The acrylonitrile copolymer of claim 1, said unit having the formula

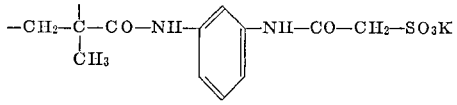

3. The acrylonitrile copolymer of claim 1, said unit having the formula

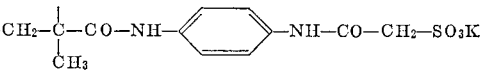

4. The acrylonitrile copolymer of claim 1, said unit having the formula

5. The acrylonitrile copolymer of claim 1, said additional copolymerised unsaturated compound being methyl methacrylate.

6. The acrylonitrile copolymer of claim 1, said additional copolymerised unsaturated compound being vinylidene chloride.

7. A process for the production of readily dyeable acrylonitrile copolymers which comprises copolymerising at least 50% by weight, based on the total amount of monomers, of acrylonitrile and 0.1 to 20% by weight of an ethylenically unsaturated sulfonic acid compound of the formula $$CH_2=\underset{R_1}{\underset{|}{C}}-CO-\underset{R_2}{\underset{|}{N}}-Ar-\underset{R_3}{\underset{|}{N}}-CO-CH_2-SO_3X$$

wherein $R_1$, $R_2$ and $R_3$ independently represent a hydrogen atom or a $C_1$ to $C_4$ alkyl radical, Ar represents an arylene radical and X represents a hydrogen atom, the ammonium group, an alkali metal or an organic ammonium group, the balance being an additional copolymerisable unsaturated compound, said copolymerising being carried out in a liquid medium in the present of a radical forming catalyst system.

8. The process of claim 7, said ethylenically unsaturated sulfonic acid compound being an alkali salt.

9. The process of claim 7, said copolymerising being carried out in an aqueous medium at pH values of between 6 and 1 in the presence of a redox catalyst system of persulfate and bisulfite.

10. The process of claim 7, said copolymerising being carried out in dimethyl formamide in the presence of a radical forming catalyst system being soluble in the reaction medium.

References Cited

UNITED STATES PATENTS 2,983,712   5/1961   Wilkinson _____ 260—79.3

FOREIGN PATENTS 698,867   12/1964   Canada.

JAMES A. SEIDLECK, Primary Examiner

U.S. Cl. X.R.

8—55; 260—63, 78.5